(12) United States Patent
Hickey et al.

(10) Patent No.: US 12,139,025 B2
(45) Date of Patent: Nov. 12, 2024

(54) BATTERY ASSEMBLY STABILIZATION MECHANISM

(71) Applicant: ARTISAN VEHICLE SYSTEMS, INC., Camarillo, CA (US)

(72) Inventors: Kyle Hickey, Camarillo, CA (US); Gaurav Mehta, Camarillo, CA (US); Nicholas Dickson, Camarillo, CA (US)

(73) Assignee: Artisan Vehicle Systems, Inc., Camarillo, CA (US)

( * ) Notice: Subject to any disclaimer, the term of this patent is extended or adjusted under 35 U.S.C. 154(b) by 0 days.

(21) Appl. No.: 18/028,580

(22) PCT Filed: Sep. 27, 2021

(86) PCT No.: PCT/US2021/052156
§ 371 (c)(1),
(2) Date: Mar. 27, 2023

(87) PCT Pub. No.: WO2022/067161
PCT Pub. Date: Mar. 31, 2022

(65) Prior Publication Data
US 2024/0083263 A1 Mar. 14, 2024

(51) Int. Cl.
*B60L 50/60* (2019.01)
*B66F 3/25* (2006.01)
*B60L 53/80* (2019.01)

(52) U.S. Cl.
CPC ............ *B60L 50/66* (2019.02); *B66F 3/25* (2013.01); *B60L 53/80* (2019.02)

(58) Field of Classification Search
CPC .......... B60L 50/66; B60L 50/71; B60L 53/80; B66F 3/25; B60K 2001/0411; B60K 2001/0416; B60K 2001/0444; B60K 2001/0455; B60K 2001/0477; B60K 2001/0483; B60S 9/02; B60S 9/04; B60S 9/10; B60S 9/12; B60S 9/16; B60S 9/20
See application file for complete search history.

(56) References Cited

U.S. PATENT DOCUMENTS

| | | | | |
|---|---|---|---|---|
| 3,336,997 A | * | 8/1967 | Yates | B62D 53/02 180/68.5 |
| 3,799,063 A | * | 3/1974 | Reed | B60L 50/66 104/34 |
| 4,165,861 A | * | 8/1979 | Hanser | B60S 9/12 254/423 |
| 4,397,365 A | * | 8/1983 | Harbe | B60K 1/04 414/349 |

(Continued)

*Primary Examiner* — Jeffrey J Restifo
(74) *Attorney, Agent, or Firm* — Corinne R. Gorski

(57) ABSTRACT

A mechanical stabilization system for a battery assembly is disclosed. The system includes an actuator and a stabilizer that are configured to work in concert. The actuator and stabilizer are disposed in a housing of the battery assembly. The system may be implemented by depression of the actuator disposed in the housing, which causes the stabilizer to retract a support post into the housing. The depression can occur during a docking operation of the battery assembly with a lift mechanism for an electric vehicle. When the actuator is released, the support post automatically reverts to its previous, deployed state. The support post is configured to maintain the battery assembly in a stable configuration when the battery assembly is separated from the electric vehicle.

15 Claims, 12 Drawing Sheets

(56) References Cited

U.S. PATENT DOCUMENTS

| | | | | |
|---|---|---|---|---|
| 5,143,386 A * | 9/1992 | Uriarte | B60S 9/02 | 180/41 |
| 5,159,989 A * | 11/1992 | Claxton | B66F 11/044 | 180/41 |
| 5,163,537 A * | 11/1992 | Radev | B60L 50/66 | 180/68.5 |
| 5,224,688 A * | 7/1993 | Torres | B60S 9/12 | 254/423 |
| 5,232,206 A * | 8/1993 | Hunt | B60S 9/12 | 254/423 |
| 5,275,525 A * | 1/1994 | Grumblatt | B60K 1/04 | 414/346 |
| 5,598,083 A * | 1/1997 | Gaskins | B60L 50/66 | 108/65 |
| 5,664,932 A * | 9/1997 | Clonch | E21F 13/006 | 180/68.5 |
| 5,722,641 A * | 3/1998 | Martin | B60S 9/12 | 254/423 |
| 5,765,810 A * | 6/1998 | Mattera | B60S 9/12 | 254/423 |
| 5,820,331 A * | 10/1998 | Odell | B60K 1/04 | 180/68.5 |
| 5,879,125 A * | 3/1999 | Odell | B60K 1/04 | 180/68.5 |
| 6,079,742 A * | 6/2000 | Spence | B60S 9/12 | 254/423 |
| 6,113,342 A * | 9/2000 | Smith | B60L 50/66 | 180/68.5 |
| 6,224,040 B1 * | 5/2001 | Mejias | B60S 9/06 | 254/423 |
| 6,619,693 B1 * | 9/2003 | Sproatt | B60S 9/12 | 254/424 |
| 6,895,648 B1 * | 5/2005 | Willett | B66F 3/247 | 254/93 VA |
| 7,726,690 B1 * | 6/2010 | James | B60J 7/165 | 182/69.5 |
| 7,770,673 B2 * | 8/2010 | Allen | B60L 53/80 | 180/68.5 |
| 8,292,015 B2 * | 10/2012 | O'Quinn | B60L 50/66 | 180/68.5 |
| 8,424,848 B1 * | 4/2013 | Hawkins, Jr. | B60S 9/12 | 254/423 |
| 9,643,574 B2 * | 5/2017 | King | B60L 50/66 | |
| 9,969,283 B2 * | 5/2018 | Deahl | B60L 53/80 | |
| 10,906,383 B2 * | 2/2021 | Huff | B60L 50/66 | |
| 10,926,660 B2 * | 2/2021 | Hickey | B60L 58/18 | |
| 11,241,974 B2 * | 2/2022 | Huff | B60K 1/04 | |
| 11,254,224 B2 * | 2/2022 | Hickey | B60L 53/80 | |
| 11,305,746 B2 * | 4/2022 | Hickey | E21C 29/24 | |
| 11,396,237 B2 * | 7/2022 | Hickey | B60L 50/64 | |
| 11,597,294 B2 * | 3/2023 | Hickey | B60L 53/80 | |
| 11,673,477 B2 * | 6/2023 | Sopko, Jr. | B60L 50/66 | 60/221 |
| 2005/0045859 A1 * | 3/2005 | Williams, Sr. | B60S 9/12 | 254/93 VA |
| 2005/0127343 A1 * | 6/2005 | Jackson, Sr. | B60S 9/12 | 254/423 |
| 2006/0082079 A1 * | 4/2006 | Eichhorn | B60S 9/12 | 280/6.155 |
| 2012/0018235 A1 * | 1/2012 | O'Quinn | B60K 1/04 | 180/68.5 |
| 2013/0220714 A1 * | 8/2013 | Rudinec | B60L 7/14 | 180/65.1 |
| 2014/0217342 A1 * | 8/2014 | Dondurur | B60S 9/12 | 254/423 |
| 2015/0071747 A1 * | 3/2015 | Deahl | B60K 1/04 | 414/469 |
| 2015/0114736 A1 * | 4/2015 | Avganim | B60K 1/04 | 180/68.5 |
| 2016/0009256 A1 * | 1/2016 | Dondurur | B60S 9/12 | 254/423 |
| 2016/0159221 A1 * | 6/2016 | Chen | B62D 31/025 | 180/53.8 |
| 2016/0167626 A1 * | 6/2016 | Alnemari | B60S 9/04 | 280/763.1 |
| 2016/0221546 A1 * | 8/2016 | Lewis | B60S 9/12 | |
| 2016/0251001 A1 * | 9/2016 | King | B60S 9/02 | 254/418 |
| 2016/0264106 A1 * | 9/2016 | Pierre | B60S 9/12 | |
| 2017/0057472 A1 * | 3/2017 | Jackson, Sr. | B60S 9/12 | |
| 2017/0170438 A1 * | 6/2017 | Jansen | H01M 50/224 | |
| 2017/0232828 A1 * | 8/2017 | Jansen | B60K 1/00 | 180/65.6 |
| 2017/0349039 A1 * | 12/2017 | Rayner | B62K 27/14 | |
| 2018/0037108 A1 * | 2/2018 | Richter | B60K 17/34 | |
| 2018/0170323 A1 * | 6/2018 | Darius | B60S 9/12 | |
| 2019/0061544 A1 * | 2/2019 | Jansen | B60L 53/14 | |
| 2019/0263241 A1 * | 8/2019 | Huff | B60K 1/00 | |
| 2019/0263242 A1 * | 8/2019 | Huff | B60L 53/80 | |
| 2019/0263269 A1 * | 8/2019 | Huff | B60L 53/80 | |
| 2019/0263270 A1 * | 8/2019 | Huff | B60L 53/80 | |
| 2020/0039477 A1 * | 2/2020 | Hernandez | B60Q 1/326 | |
| 2020/0207217 A1 * | 7/2020 | Brandenstein | B60L 50/53 | |
| 2020/0298713 A1 * | 9/2020 | Baumann | B60R 16/0238 | |
| 2020/0317082 A1 * | 10/2020 | Huff | B60L 53/80 | |
| 2020/0384869 A1 * | 12/2020 | Hickey | B60K 1/04 | |
| 2020/0384969 A1 * | 12/2020 | Huff | B60T 11/108 | |
| 2021/0170852 A1 * | 6/2021 | Fan | A01D 34/78 | |
| 2021/0270004 A1 * | 9/2021 | Durkin | E02F 3/422 | |
| 2022/0173367 A1 * | 6/2022 | Andrews | H01M 50/502 | |

* cited by examiner

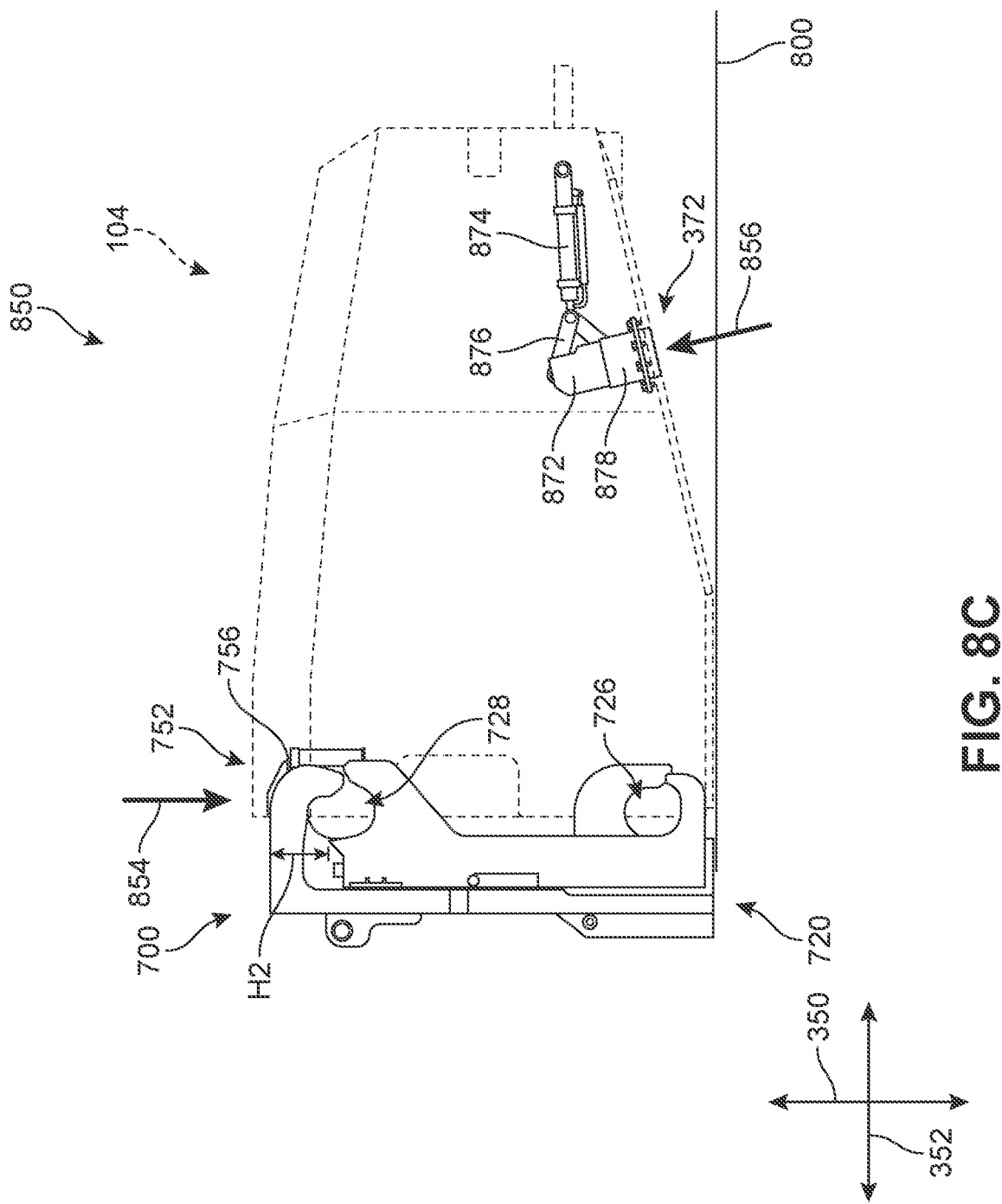

BATTERY ASSEMBLY STABILIZATION MECHANISM

RELATED APPLICATION DATA

This application is a § 371 National Stage Application of PCT International Application No. PCT/US2021/052156 filed Sep. 27, 2021 with priority to U.S. patent application Ser. No. 17/033,975 filed Sep. 28, 2020.

TECHNICAL FIELD

The present invention relates generally to mining vehicles.

BACKGROUND OF THE INVENTION

Various types of mining vehicles may be used to remove and transport material in a mining operation. One type of vehicle, a loader, may be used. Traditional loaders may operate with diesel-powered engines. Diesel powered loaders can have different loading capacities.

Electric vehicles may operate with one or more electric motors powered by batteries. Batteries in electric vehicles, such as cars and other kinds of vehicles, may be large and heavy. More specifically, electric loaders and LHD (load, haul, dump) machines such as those with capacity of four tons or greater, depend on batteries that are bulky and have an irregular exterior structure. Disconnecting and reconnecting batteries may require external infrastructure such as cranes, lifts or other systems as well as multiple manual steps.

SUMMARY OF THE INVENTION

Various embodiments of a mining vehicle and associated components are disclosed. The embodiments provide mining vehicles that are battery powered rather than diesel powered.

In one aspect, a stabilization system for a battery assembly, the stabilization system is disclosed. The stabilization system includes a housing with a forward portion, a rearward portion, a first side portion, a second side portion, and a bottom region. The stabilization system further includes a first stabilizer disposed in the rearward portion. The first stabilizer includes a first support post that extends distally outward from a first aperture formed in the bottom region. The stabilization system also includes a first actuator disposed in the forward portion, where the first actuator is mechanically connected to the first stabilizer. In addition, the first stabilizer is configured to retract the first support post in response to an actuation of the first actuator, thereby automatically transitioning the stabilization system from a deployed configuration to a retracted configuration.

In another aspect, a stabilization system for an electric vehicle is disclosed. The stabilization system includes a battery assembly that further includes a housing, a first actuator, and a first stabilizer. The stabilization system further includes an electric vehicle with a lift mechanism, where the lift mechanism is configured to dock with the battery assembly. In addition, the lift mechanism actuates the first actuator when the battery assembly docks with the lift mechanism, thereby causing a first support post of the first stabilizer to automatically transition from a deployed state to a retracted state.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 8A-8C depict an embodiment of a mounting sequence between a battery assembly and a battery lift mechanism.

DETAILED DESCRIPTION

Figure 1:
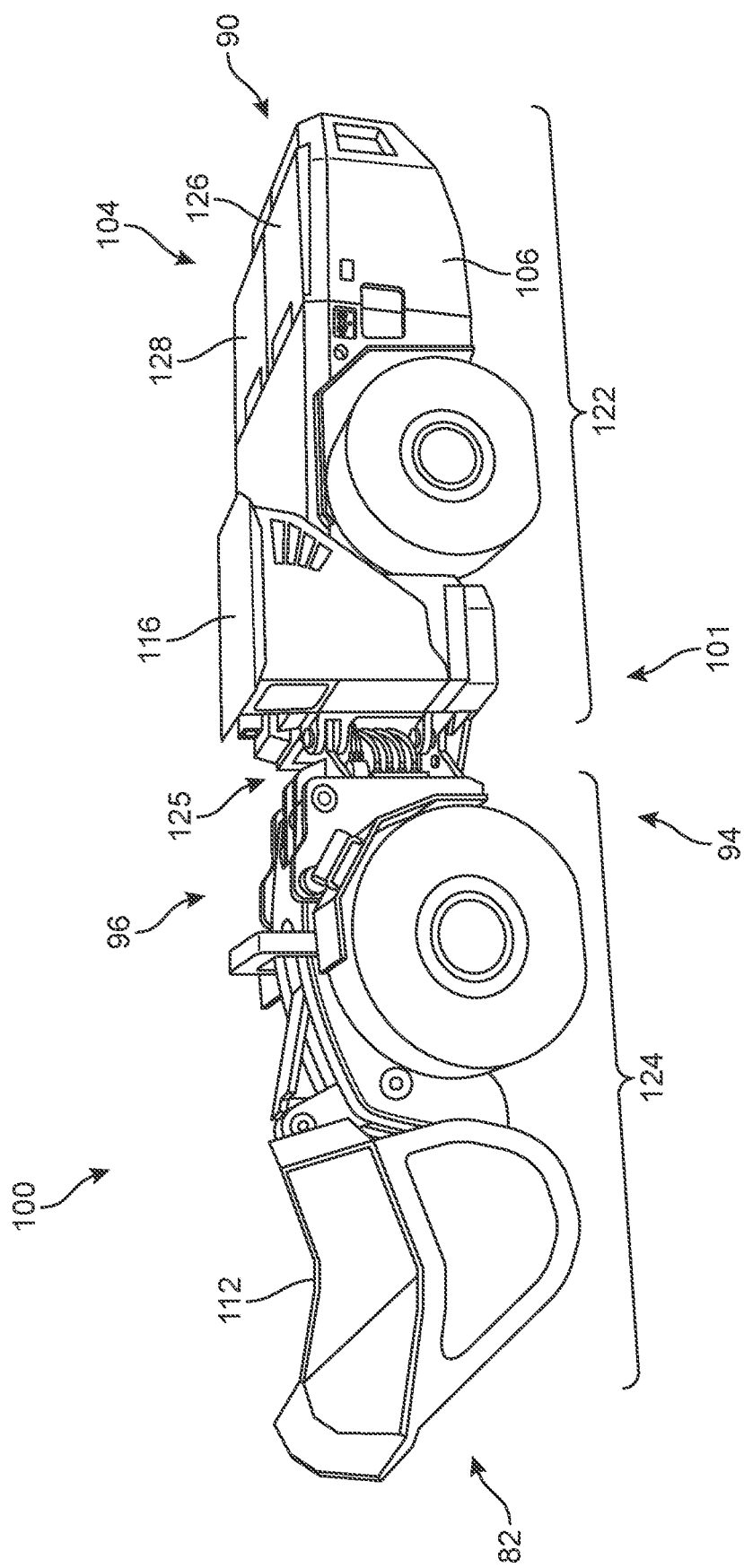
FIG. 1 shows a schematic view of an embodiment of a battery assembly mounted on a mining vehicle.

The present disclosure is directed to a stabilization system for a battery assembly. In different embodiments, the outer cage or housing of the battery assembly includes a curvature along its bottom surface. In some cases, when the battery assembly is disposed on the ground, there may be a tendency for the battery assembly to tip downward or otherwise destabilize. Traditionally, this issue has been addressed by limiting the placement of the battery assembly to ground surfaces that are sufficiently inclined so as to compensate for the tendency of the battery assembly to tip. As will be discussed in further detail below, the proposed embodiments provide a stabilization system configured to automatically maintain the battery assembly in a stable pose, whether or not the ground surface includes an incline.

It is desirable to have a system that can efficiently swap out discharged batteries with fully charged batteries so that vehicles are not idle for long periods as they wait for recharging. The proposed systems can considerably reduce the infrastructure and time needed for a battery swap to occur. In particular, by implementation of the proposed systems, an operator of the vehicle is no longer required to dismount a battery in a location in which the ground surface is correctly inclined. Instead, the battery dismount and re-mount process can occur on a much wider variety of surface areas. In addition, the location in which mining operations are being performed need not include specialized battery drop off and pick up zones that have been designed with an inclined ground surface.

The proposed embodiments describe a system by which the battery assembly housing itself includes provisions for ensuring the stabilization of the battery assembly on various ground surfaces. As discussed in detail below, the system includes a self-contained "kickstand" or support post that automatically deploys when the battery assembly is off-loaded, thereby maintaining the battery assembly in a stable position. For example, as the battery assembly is dropped to the ground by a lift mechanism of the vehicle, at least a first support post will automatically deploy from the bottom of the battery assembly. The support post(s) maintain the battery assembly in a substantially upright position, rather than an unbalanced or tilted position. In addition, during initial docking of the battery assembly, the system is configured to respond to pressure applied by a lift mechanism of the vehicle by an automatic retraction of the kickstand. It may be appreciated that the proposed system components are passive, with no controls or power necessary. In one embodiment, the extension and retraction of the kickstand is hydraulically driven. In some embodiments, the stabilization system includes two support posts that operate independently, providing redundancy to the system and thereby facilitating reliable, durable, and responsive battery stabilization.

As noted above, the proposed embodiments are directed to a battery connection system for a vehicle. The vehicle is zero emissions electric vehicle and uses only a battery to power the vehicle in place of a conventional diesel engine. For purposes of example, the proposed systems and methods will be described with respect to a mining vehicle. The electric vehicle may be used in mining operations. In some embodiments, the vehicle is a loader or an LHD (load, haul, dump) machine. For example, the loader may have a loading capacity of a few tons, or greater ranging from 10-tons and above. The vehicle presented for purposes of illustration in FIGS. 1 and 2 has an 18-ton capacity. However, embodiments of the stabilization system may be implemented with various batteries configured for use with a wide range of electric vehicles and vehicle capacities.

Furthermore, it should be understood that in different embodiments the proposed systems and methods may be used with other types of electric-powered vehicles, including automobiles and other motorized vehicles, such as cars, trucks, airplanes, and motorcycles. The embodiments include various provisions that enable a vehicle to connect and disconnect to a removable battery pack.

The mining vehicle described herein is a heavy duty industrial electric vehicle designed to operate in a continuous work environment such as a sub-surface mine. An overview of a sub-surface mine environment and general description of electric vehicles and electric power systems for sub-surface mining are described in co-pending application Ser. No. 15/133,478 filed on Apr. 20, 2016, titled "System And Method For Providing Power To A Mining Operation," the entire contents of which are hereby incorporated by reference. Electric mining vehicles are powered by at least one heavy-duty, high-powered battery pack which is comprised of multiple battery modules contained in a pack housing. Each module is comprised of multiple cells. The modules may be equipped with an array of operational sensors and may be provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of these types of battery packs and the associated data generation and monitoring can be found in U.S. patent application Ser. No. 14/494,138 filed on Sep. 23, 2014, titled "Module Backbone System;" application Ser. No. 14/529,853 filed Oct. 31, 2014, titled "System and Method for Battery Pack Charging and Remote Access;" and application Ser. No. 14/721,726 filed May 26, 2015, titled "Module Maintenance System;" the entire contents of which are hereby incorporated by reference. In other embodiments, different battery assemblies configured for use by other types of vehicles may be incorporated for use by the proposed systems.

FIG. 1 illustrates a schematic isometric view of a vehicle 100. As a general matter, vehicle 100 may be comprised of a frame 101 (or chassis), a set of wheels 110 and a bucket 112. Bucket 112 may be coupled with frame 101 and may be tilted between a lowered position (shown in FIG. 1) and a raised position during operation. For reference, vehicle 100 is also characterized as having a front end 92, a rearward end 90, a first side 94 and an opposite-facing second side 96. Vehicle 100 is also provided with various standard vehicular provisions, such as cab 116 for receiving one or more operators. In some embodiments, vehicle 100 may be divided into a first frame portion 122 and a second frame portion 124. First frame portion 122 may be a rear portion associated with cab 116. Second frame portion 124 may be a forward portion associated with bucket 112. In some embodiments, a mechanical linkage 125 connects first frame portion 122 and second frame portion 124 so that the two portions can move relative to one another (e.g., swivel or pivot).

Vehicle 100 also includes a propulsion system comprising one or more electric motors that are powered by one or more batteries. In some embodiments, vehicle 100 may include at least two electric motors for powering each pair of wheels. In some embodiments, vehicle 100 may include four electric motors, where each motor independently powers one of four wheels. It may be appreciated that the exact locations of each motor may vary from one embodiment to another.

Some embodiments may also be equipped with an auxiliary motor (not shown). In some embodiments, an auxiliary motor may be used to drive other sub-systems of vehicle 100, such as a mechanical system that may be used to mount and dismount batteries. Optionally, in other embodiments an auxiliary motor may not be used.

Embodiments can incorporate one or more batteries to power set of motors and/or an auxiliary motor. As used herein, the term "battery pack" generally refers to multiple battery modules in a heavy-duty pack housing. Each module is comprised of multiple battery cells. In this way, a battery pack also refers to a collection of individual battery cells. The battery cells, and therefore modules, are functionally interconnected together as described in the previously incorporated pending applications.

In different embodiments, a battery pack could incorporate any suitable kind of battery cell. Examples of battery cells include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. In particular, in some cases two different battery cells in a battery pack could have different voltage levels. Similarly, the battery cell may have various energy capacity levels. In particular, in some cases, two different battery cells in a battery pack could have different capacity levels.

In some cases, it may be desirable to use multiple battery packs. As used herein, the term "battery pack assembly", or simply "battery assembly" refers to a set of two or more battery packs. In some embodiments, a battery assembly may also include a cage or similar container for holding the separate battery packs together.

As seen in FIG. 1, vehicle 100 is configured with a primary battery assembly ("battery assembly") 104. In some embodiments, primary battery assembly 104 may be located at rear end 90. In one embodiment, primary battery assembly 104 may be disposed near to cab 116, which is located along the first frame portion 122 and on first side 94 of vehicle 100. In some embodiments, primary battery assembly 104 comprises two battery packs. These include a first battery pack 126 and a secondary battery pack 128. The first battery pack 126 and second battery pack 128 may be retained within an interior cavity of the battery housing. In other embodiments, the primary battery assembly 104 includes only one battery pack, or more than two battery packs.

In different embodiments, vehicle 100 may also include an auxiliary battery pack. The auxiliary battery pack may be disposed in a separate location from primary battery assembly 104. As discussed below, auxiliary battery pack may be used to power vehicle 100 while the primary battery assembly is being swapped. Auxiliary battery pack may also be referred to as a "tramming battery". As seen in FIG. 1, primary battery assembly 104 is exposed on an exterior of vehicle 100. Specifically, various exterior surfaces of an exterior housing cage ("housing") 106 that contains one or more battery packs may comprise part of the exterior of vehicle 100. In contrast, the auxiliary battery pack can be an internal battery and is retained within the chassis of vehicle 100.

In different embodiments, battery assembly 104 may be removably attached to vehicle 100. As used herein, the term "removably attached" refers to two components that are joined together but that can be separated without destroying one or the other component. That is, the components can be non-destructively detached from one another. Exemplary modalities of "removable attachment" include connections made using removeable fasteners, latches, locks, hooks, magnetic connections as well as other kinds of connections. In contrast, an auxiliary battery pack may be "fixedly attached" to vehicle 100. For example, an auxiliary battery pack may not be separated from vehicle 100 without requiring part of vehicle 100 to be disassembled and/or without destroying one or more parts. However, in other embodiments, the auxiliary battery may also be removably attached.

The embodiments may provide a zero emissions electric vehicle with comparable hauling capacity to similarly sized diesel-powered vehicles. In discussing the form factor of a vehicle, the description discusses the overall length, overall width, and overall height of a vehicle, as well as various other dimensions. As used herein, the term overall length refers to the distance between the forward-most location on a vehicle and the rearward-most location on the vehicle. In some cases, the rearward-most location may be a located on the cab or battery assembly. The term overall width refers to the distance between opposing sides of the vehicle, and is measured at the "outermost" locations along the opposing sides. The term overall height refers to the distance between the lowest point of a vehicle (usually the bottom of the wheels) and the highest point of a vehicle.

Each of these vehicle dimensions may correspond with an axis or direction of vehicle 100. That is, the overall length of vehicle 100 may be taken along a lengthwise direction (or axis) of vehicle 100. The overall width of vehicle 100 may be taken along a widthwise direction (or axis) of vehicle 100. Also, the overall height of vehicle 100 may be taken along a height-wise direction (or axis) of vehicle 100.

Embodiments can include a system for mounting and dismounting one or more battery packs. For example, vehicle 100 may incorporate an onboard mounting and dismounting system. The mounting and dismounting system may include all the necessary components required to lift and lower primary battery assembly 104. As noted above, in order for the battery pack to provide power to vehicle 100, the battery pack must be electrically connected to the vehicle. For example, in some embodiments each battery pack of primary battery assembly 104 may power a different set of motors (and accordingly, a different set of wheels). In some cases, each battery pack may power a pair of motors on a particular axle (e.g., front axle or rear axle). In one embodiment, first battery pack 126 may be connected via a power cable to components on a front axle assembly. In one example, first battery pack 126 may provide power to both a first electric motor and a second electric motor to power a front set of wheels. Likewise, the second battery pack 128 may be connected via a power cable to components of a rear axle assembly. For example, second battery pack 128 may provide power to both a third electric motor and a fourth electric motor to power a rear set of wheels. By powering the front and rear axles using separate battery packs, the amount of power required that must be delivered to a single source is reduced. This may allow for the use of smaller power cables (or cables with a lower current rating) that are easier to manage and/or less likely to fail. In other embodiments, the battery pack(s) may be managed to power various components of the vehicle in other arrangements.

As seen in FIG. 1, battery assembly 104 is mounted on the rear end 90 of vehicle 100. Specifically, housing 106 of the battery assembly 104 is mounted and docked onto a rearward-facing portion of vehicle adjacent to where cab 116 is disposed. Moreover, with battery assembly 104 mounted to vehicle 100, battery assembly 104 forms parts of the rearward surfaces of vehicle 100. However, it can be desirable to have a system that can efficiently swap out discharged batteries with fully charged batteries so that vehicles are not idle for long periods as they wait for recharging. In different embodiments, the vehicle is configured with all the provisions necessary to dismount discharged batteries and mount fully charged batteries on the ground of a mine, for example as discussed in U.S. Patent Publication Number 2019/0263269 filed on Feb. 28, 2018, titled "Mounting and dismounting system for a battery assembly," the entire contents of which are hereby incorporated by reference. As a general matter, when the vehicle has depleted the power from its current battery packs assembly such that the battery assembly has a low charge, the vehicle can be moved towards an area where a fully charged battery assembly (i.e., an assembly with fully charged battery packs) is disposed. Before mounting a new battery assembly, however, the vehicle may travel to a location that is adjacent to the charged battery assembly in order to dismount (physically remove or "drop off") the discharged battery assembly.

Figure 2:
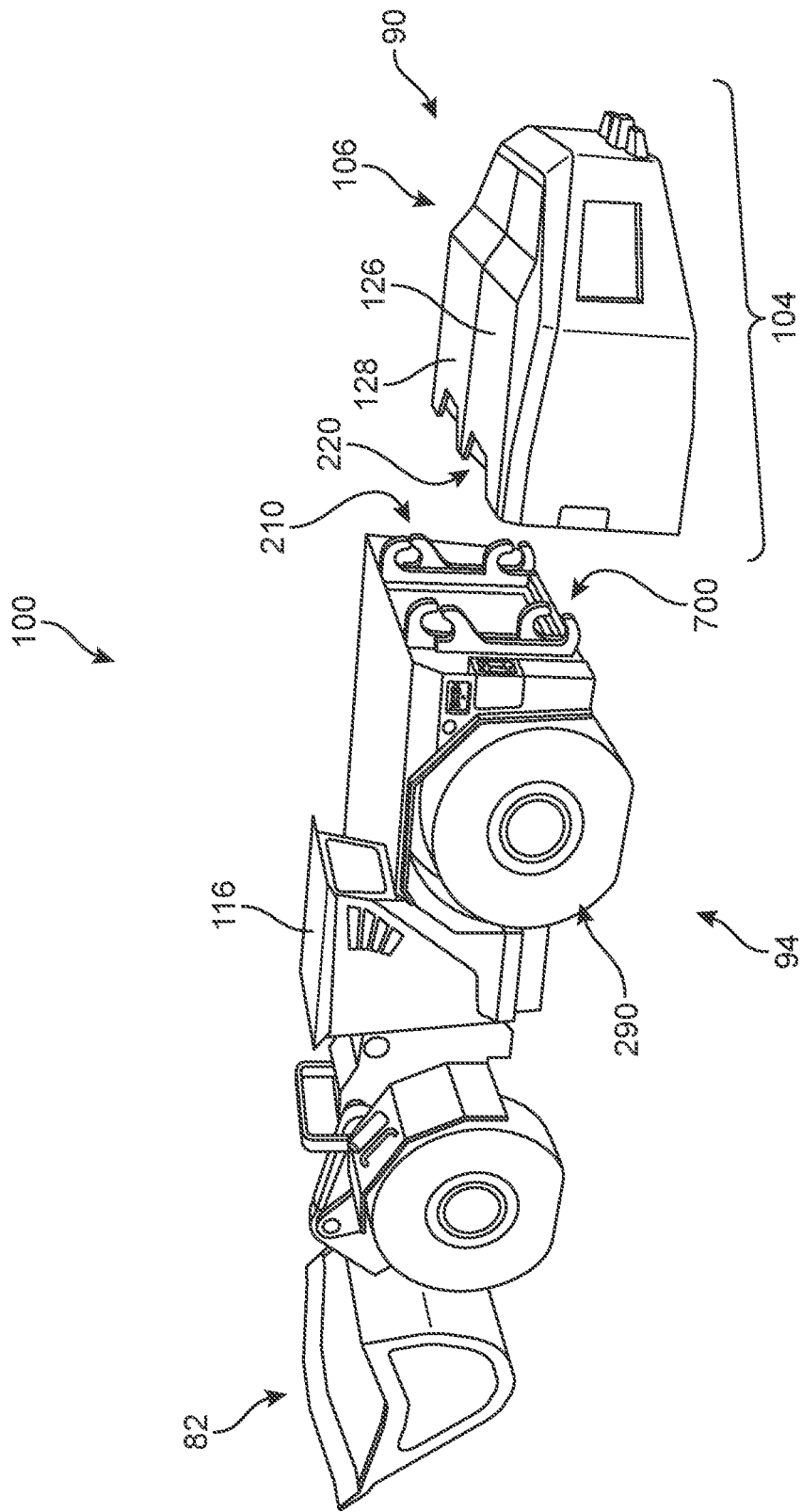
FIG. 2 shows a schematic side view of an embodiment of a battery assembly dismounted from a mining vehicle.

An example of the dismounted arrangement can be observed in FIG. 2, which depicts an isometric view of vehicle 100 where the battery assembly 104 has been dismounted and separated from vehicle 100. When battery assembly 104 is dismounted, the vehicle 100 includes an exposed rearward-facing surface 210 including a lift mechanism 700 along the rear surface of vehicle 100.

When a battery assembly is removed from vehicle 100, the geometry of the vehicle's exterior surface changes since the walls of the battery assembly form a part of the vehicle's exterior surface when mounted. In addition, the battery assembly 104 includes an exposed forward-facing surface with a central region 220, where the central region 220 and lift mechanism 700 are designed to face one another during mounting and connection. By placing the battery assembly on the exterior of vehicle 100, it may be easier to mount and dismount the battery compared to electric vehicles with internally located batteries. Moreover, the battery cage can simultaneously provide structural support for containing the battery packs as well as provide structural support on an exterior of the vehicle.

In this example, battery assembly 104 includes outermost housing 106, first battery pack 126, and second battery pack 128. Each battery pack may further include one or more battery cells. In general, housing 106 may serve to retain and protect each battery pack and provide an array of external connector portions for facilitating a connection to the electric vehicle. To this end, housing 106 may be sized and dimensioned to receive each of first battery pack 126 and second battery pack 128. In some embodiments, housing 106 is configured as a relatively thin outer casing with an interior cavity that can hold two battery packs in a side-by-side configuration. In particular, housing 106 may have a horizontal footprint that is slightly larger than the horizontal footprint of the two battery packs together. Housing 106 also has a vertical height that is slightly larger than the height of a single battery pack. Furthermore, in some embodiments, housing 106 may primarily be closed on the bottom and side surfaces. However, housing 106 may be partially open on the forward side that is configured to face the vehicle so that connecting ports or other provisions of the battery packs can be exposed.

In different embodiments, housing 106 may also include provisions to facilitate mounting and dismounting. Some embodiments can include one or more horizontal bars that are configured to facilitate mounting (see FIG. 5). Some embodiments can include one or more vertical bars that are configured to facilitate mounting. Some embodiments can include a combination of horizontal and vertical bars to facilitate mounting.

As noted earlier, the proposed systems and methods provide a stabilization mechanism by which the battery assembly 104 may be maintained in a stable pose during separation from the vehicle 100, as well as a mechanism by which the stabilizers for the battery assembly 104 retract in response to a mounting operation with a vehicle. The system will now be described in greater detail with reference to FIGS. 3-9 below.

Figure 3:
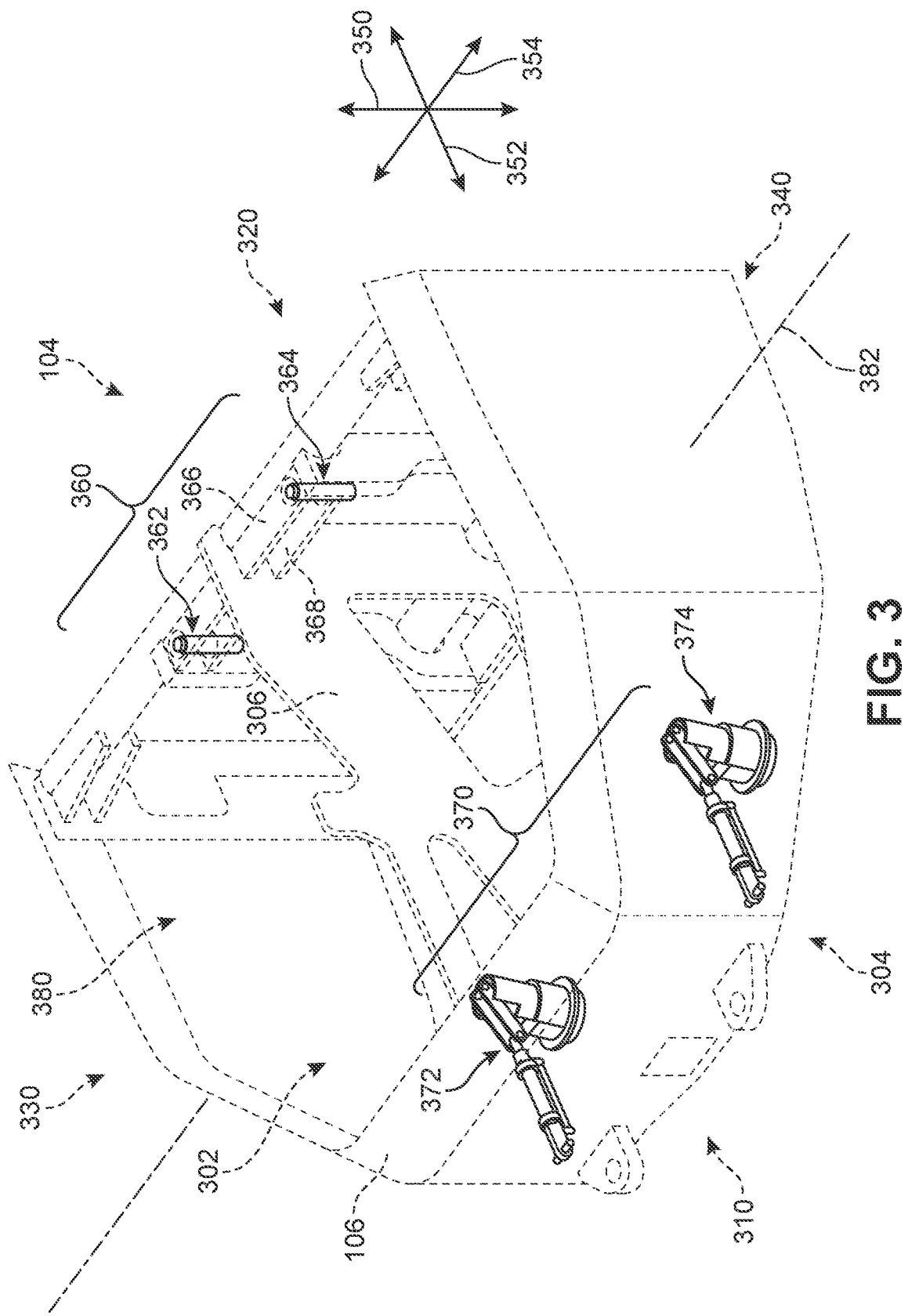
FIG. 3 shows a schematic view of various internal components of a battery assembly housing, according to an embodiment.

In order to provide the reader with a greater understanding of the proposed embodiments, additional details regarding the battery assembly 104 are discussed with reference to FIGS. 3-6. In FIG. 3, an isometric interior view of the battery housing 106 is shown in which the battery packs have been removed for purposes of clarity, revealing an interior cavity 380. Some aspects of the stabilization system can be more clearly observed, including a stabilization mechanism 370 and an actuation mechanism 360. In the embodiments presented herein, the stabilization mechanism 370 includes a first stabilizer 372 and a second stabilizer 374, and the actuation mechanism 360 includes a first actuator 362 and a second actuator 364. It should be understood that while two stabilizers and two actuators are shown as one example of the proposed system in which redundancy of the features are provided, in other embodiments the stabilization mechanism 370 may comprise only a single stabilizer and the actuating mechanism 360 may comprise only a single actuator.

For purposes of reference, the components of the stabilization system can include a vertical axis 350, a longitudinal axis 352, and a lateral axis 354. The term "longitudinal," as used throughout this detailed description and in the claims, refers to a direction extending along the length of a component (from the rear of the component to the front). For example, a longitudinal direction of the battery assembly 104 extends from a rearward portion 310 to a forward portion 320. The term "forward" or "front" is used to refer to the general direction which lies forward of a lateral boundary 382, and the term "rearward" or "back" is used to refer to the opposite direction, i.e., the direction which lies rearward of the lateral boundary 382. In addition, the term "lateral direction," as used throughout this detailed description and in the claims, refers to a side-to-side direction extending along the width of a component. In this case, the lateral direction may extend between a first side portion ("first side") 330 and a second side portion ("second side") 340 of the battery assembly 104, with the first side 330 being the region disposed on one side of a central planar structure 306 disposed along a midline of the housing 106, and the second side 340 being the region that is disposed on the opposite side of the central planar structure 306.

Furthermore, the term "vertical," as used throughout this detailed description and in the claims, refers to a direction generally perpendicular to both the lateral and longitudinal directions. For example, in cases where a component is disposed on a ground surface, the vertical direction may extend from the ground surface upward. It will be understood that each of these directional adjectives may be applied to individual components of the stabilization system. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction. For example, a vertical direction may extend between a top region 302 and a bottom region 304.

It will be understood that the rearward portion 310, forward portion 320, first side 330, second side 340, top region 302, and bottom region 304 are only intended for purposes of description and are not intended to demarcate precise regions of the battery assembly. For example, in some cases, one or more of the regions may overlap. Likewise, the first side and the second side are intended to represent generally two sides, rather than precisely demarcating the battery assembly into two halves.

In FIG. 3, the housing 106 is illustrated as see-through or transparent to better reveal the components of the stabilization mechanism 370 and actuation mechanism 360. For example, each of the first stabilizer 372 and second stabilizer 374 can be seen installed in the rearward portion 310 of the housing 106, and each of the first actuator 362 and second actuator 364 are installed in the forward portion 320 of the housing 106. In addition, the first stabilizer 372 and first actuator 362 are disposed on first side 330, and second stabilizer 374 and second actuator 364 are disposed on second side 340. Furthermore, both first stabilizer 372 and second stabilizer 374 are positioned closer to the bottom region 304, and first actuator 362 and second actuator 364 are positioned closer to top region 302.

In different embodiments, the first actuator 362 and second actuator 364 are retained in two separate channels that extend between an upper platform portion 366 and a lower platform portion 368. The upper platform portion 366 and lower platform portion 368 each extend in a direction substantially aligned with the lateral axis 354 and include a pair of apertures to allow for the passage of each cylindrical actuator. The battery assembly 104 of FIG. 3 is shown in a retracted mode where the top of each of the two actuators is substantially flush or level with the uppermost surface of the upper platform portion 366, and the two stabilizers are retained entirely within the overall structure of the housing 106.

Figure 4:
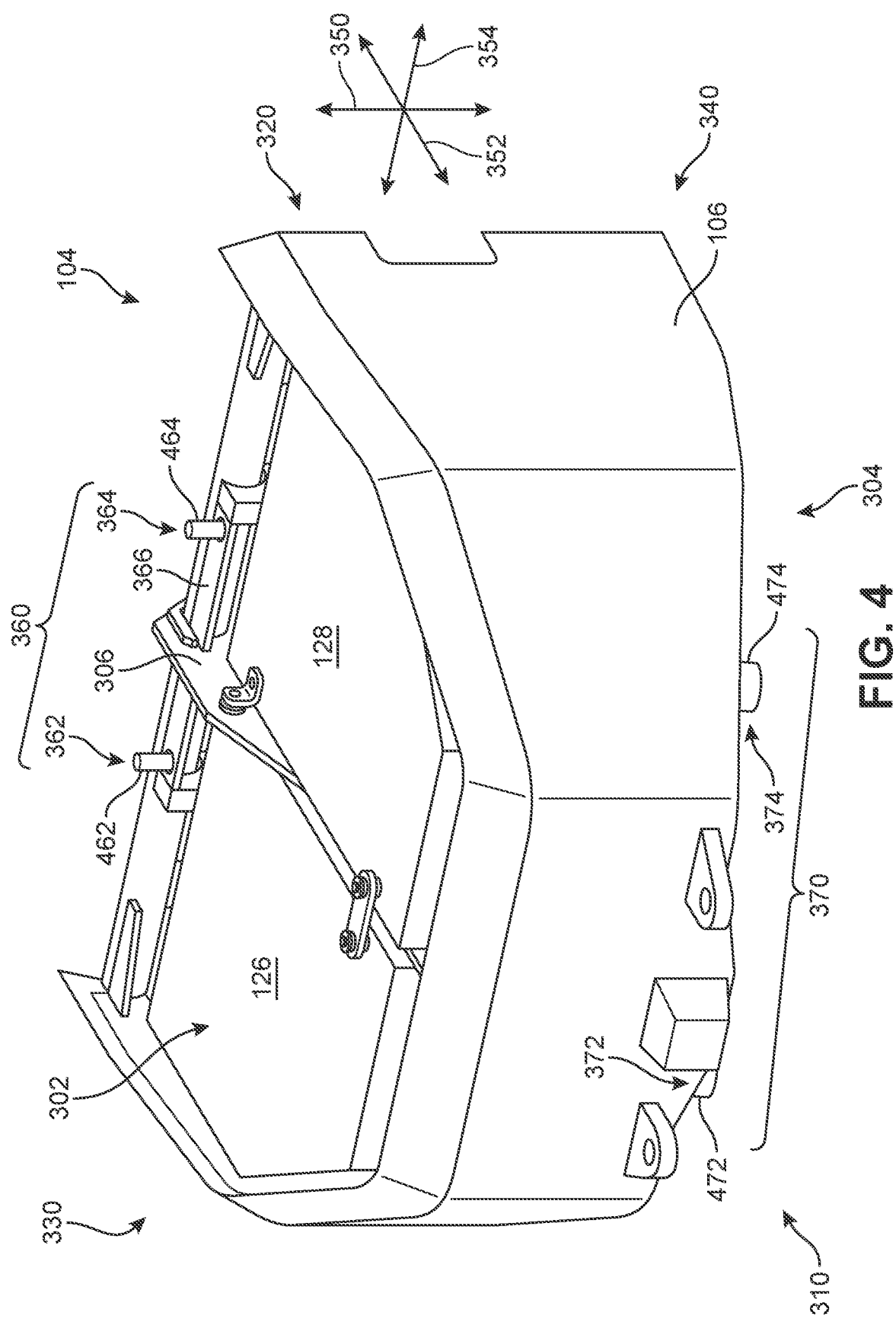
FIG. 4 is a schematic isometric rearward view of an embodiment of a battery assembly in a deployed mode prior to being mounted on a mining vehicle.
Figure 5:
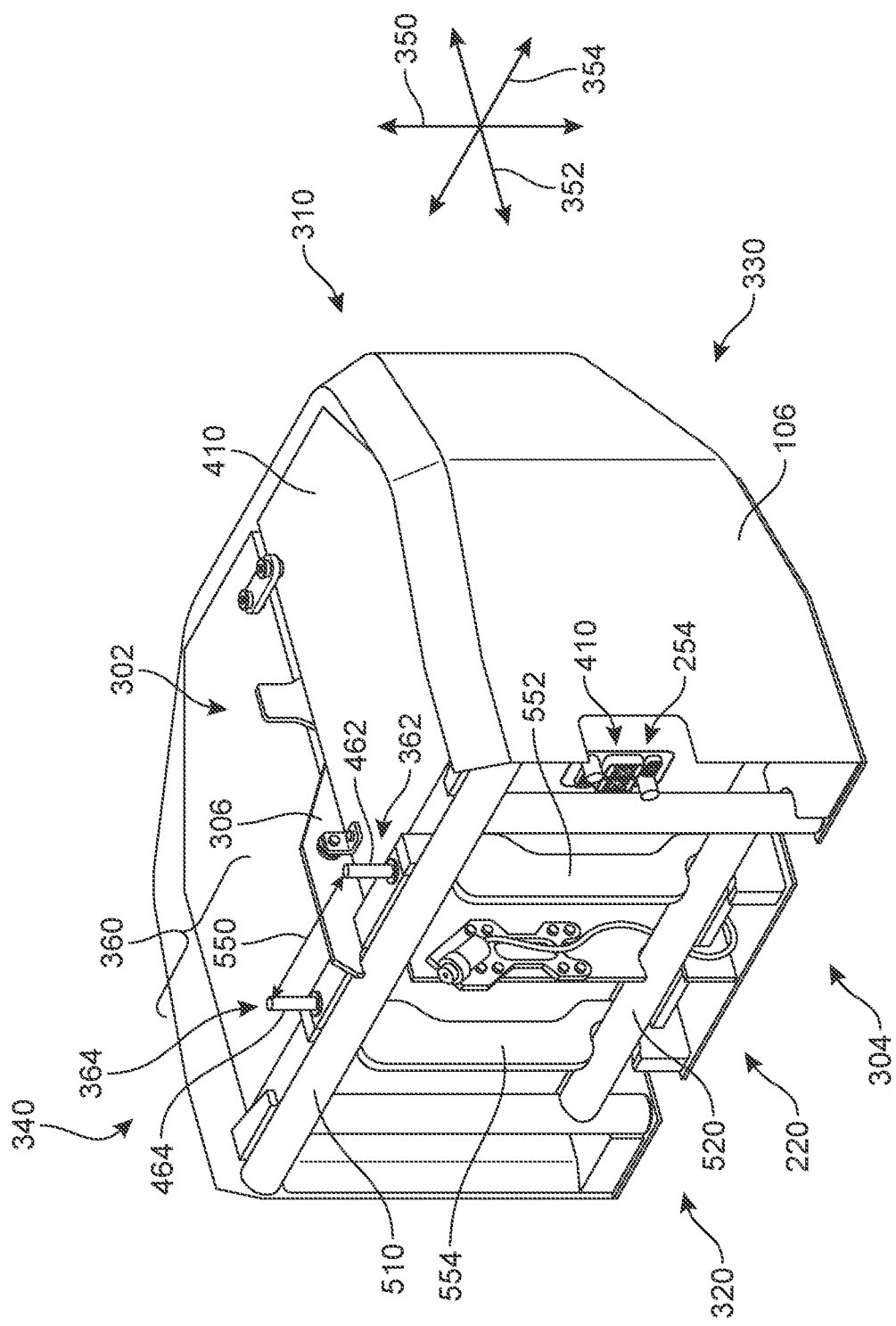
FIG. 5 is a schematic isometric front view of an embodiment of a battery assembly in a deployed mode prior to being mounted on a mining vehicle.
Figure 6:
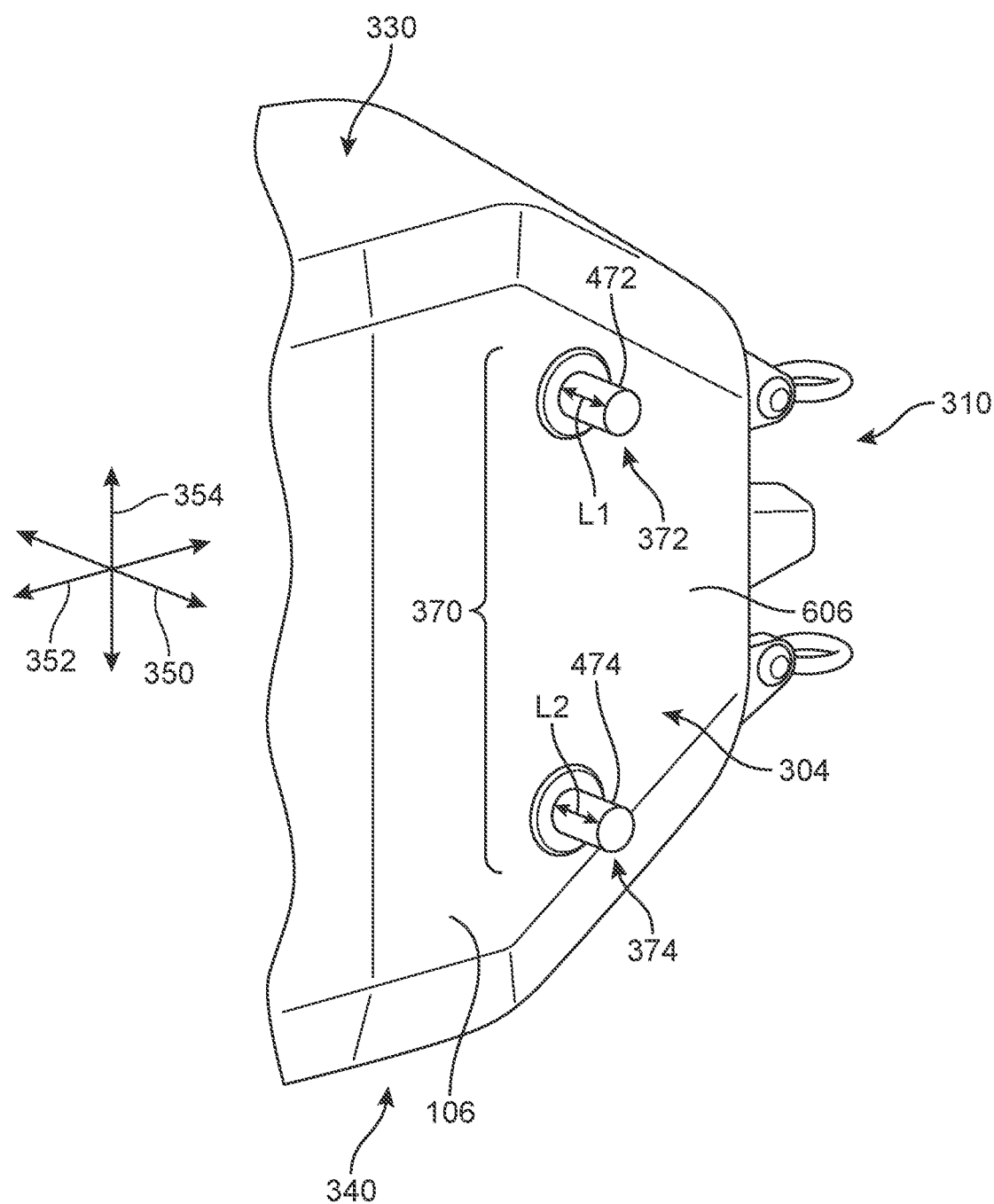
FIG. 6 is a schematic isometric bottom-side view of an embodiment of a battery assembly in a deployed mode prior to being mounted on a mining vehicle.

In contrast, FIGS. 4-6 depict the stabilization system of the battery assembly 104 in a deployed mode, where a top portion ("depressive posts") of each of the two actuators protrudes out of the apertures formed in the upper platform portion 366 and are external relative to the remainder of housing 106, and portions of the two stabilizers are also protruding outward in a substantially downward direction, outside of the overall structure of the housing 106. Further details regarding the structural features and transition between the retracted mode and deployed mode will be discussed with reference to FIGS. 8A-9 below.

Referring first to FIG. 4, an isometric view of the battery housing 106 in which the full battery assembly 104, including the first battery pack 126 and second battery pack 128, is shown where the stabilization system is in a deployed mode. A large part of the structures of each of the actuators and stabilizers are now obstructed from view as a result of the insertion of the battery packs and lack of transparency of the housing 106. However, because the system is now in the deployed mode, the top portions of each of the first actuator 362 and second actuator 364, as well as support posts of each of first stabilizer 372 and second stabilizer 374, are depicted as protruding distally outward from the outermost surface of the housing 106. More specifically, a first top portion 462 of the first actuator 362, and a second top portion 464 of the second actuator 364 can be seen extending above the top region 302. In some embodiments, the top portions are substantially cylindrical in shape, with a length extending in a direction parallel to the vertical axis 350. Similarly, a first support post 472 of the first stabilizer 372 and a second support post 474 of the second stabilizer 374 are also visible extending from apertures in the bottom region 304. The two support posts are substantially cylindrical in shape, with a length extending in a rearward and downward direction. In one embodiment, the support posts extend outward diagonally relative to the vertical axis 350. In other embodiments, the top portions and/or support posts may have a substantially rectangular prism shape, or other three-dimensional shapes configured to provide similar functionality as described herein.

Referring next to FIG. 5, the battery assembly 104 shown in FIG. 4 has been rotated, allowing for an isometric front view presenting the forward portion 320 and first side 330, as well as top region 302. In this view, the stabilization system of the battery assembly 104 is again in the deployed mode, and protruding top portions including first top portion 462 and second top portion 464 of actuation mechanism 360 can be observed extending upward from apertures formed in upper platform portion 366. The top portions are extended distally upward relative to an exposed upper surface 410 of the battery packs that are disposed in the housing 106. The two top portions are spaced apart by a distance 550 along the lateral axis 354. With the battery packs in place, only two portions of the central planar structure 306 are exposed, extending upward along the vertical axis 350. In some embodiments, the central planar structure 306 can be understood to bisect distance 550 such that each top portion is spaced apart at a substantially similar distance from either side of the central planar structure 306 in a generally symmetrical arrangement.

As seen in FIG. 5, forward portion 320 of housing 106 further includes a set of horizontal mounting bars, including an upper horizontal mounting bar 510 and a lower horizontal mounting bar 520. The housing 106 can also include a set of vertical mounting bars, as shown by the two pillars extending vertically on either side of the forward portion 320. It may be appreciated that both horizontal bars and vertical bars can facilitate mounting in at least three ways. First, either type of bar can be grasped by components of a mounting and dismounting system to help raise and/or lower the battery assembly. Second, either type of bar can facilitate horizontal and/or vertical alignment by interacting with a corresponding component on a mounting and dismounting system (e.g., a v-shaped block that may help to automatically align the battery cage in the horizontal and/or vertical directions). Third, either type of bar can be locked in place, for example using one or more latches or other locking mechanisms. It may be appreciated though that in different embodiments horizontal and vertical bars could be used to achieve different functions (e.g., horizontal bars for lifting, alignment and latching and vertical bars for alignment and latching but not lifting).

In different embodiments, the battery assembly 104 may further include one or more bar supports that have a length extending in a substantially vertical direction along the forward-facing surface of the forward portion 320 of the housing 106. The bar supports provide structural support to the two parallel mounting bars (extending in the lateral direction) that will be grasped by a lift mechanism of the vehicle (see FIG. 7 below). In the embodiment of FIG. 5, two bar supports are included. In some embodiments, the first top portion 462 is disposed slightly inward (i.e., closer to central planar structure 306) relative to a first bar support 552 and the second top portion 464 is disposed slightly inward (i.e., closer to central planar structurer 306) relative to a second bar support 554. Each bar support can be understood to generally mark the boundaries of the central region 220 of the forward portion 320 that will be approximately aligned with the engagement region of the lift mechanism of the vehicle. Thus, the actuator mechanism 360 can be understood to be located within a specific area or region (here referred to as the central region) of the forward portion 320 that is configured to be engaged by or docked to the vehicular lift mechanism (discussed in FIG. 7). For purposes of this disclosure, docking refers to when the battery assembly has been securely engaged by the lift mechanism of the vehicle, whether or not lifting has occurred (see FIGS. 8A-8C). In addition, mounting refers to when the battery assembly has been lifted up onto the vehicle and is ready to be connected to the vehicle itself (see FIG. 1).

Additional details regarding the stabilizing mechanism 370 is provided now with reference to FIG. 6, which depicts an isometric bottom view of the housing 106. The bottom region 304 includes a rearward bottom surface 606 from which two support posts are extending distally outward. The first support post 472 extends a first length L1 from the rearward bottom surface 606 along first side 330 and the second support post 474 extends a second length L2 from the rearward bottom surface 606 along second side 340. In some embodiments, first length L1 and second length L2 are substantially similar, allowing for an even distribution of weight on the ground, though in other embodiments, these lengths can be modified to accommodate varying surface irregularities.

Furthermore, in cases where the support posts are substantially cylindrical, the diameter of the bottommost surface (i.e., the surface of the post configured to contact the ground) of each support post can be substantially equal, though in other embodiments, the diameters can differ from one another and be modified to accommodate a different weight distribution in the housing. In different embodiments, the bottommost surfaces can be substantially smooth, while in other embodiments, it may include various traction elements such as texturing, nubs, ridges, bumps or other elements that can provide greater stability and/or grip. It should be understood that in different embodiments, when the support posts retract, they will be disposed entirely and retained within the housing 106, while in the extended position the support posts are exposed and disposed outside of the housing 106, via two apertures formed in the rearward bottom surface 606.

Figure 7:
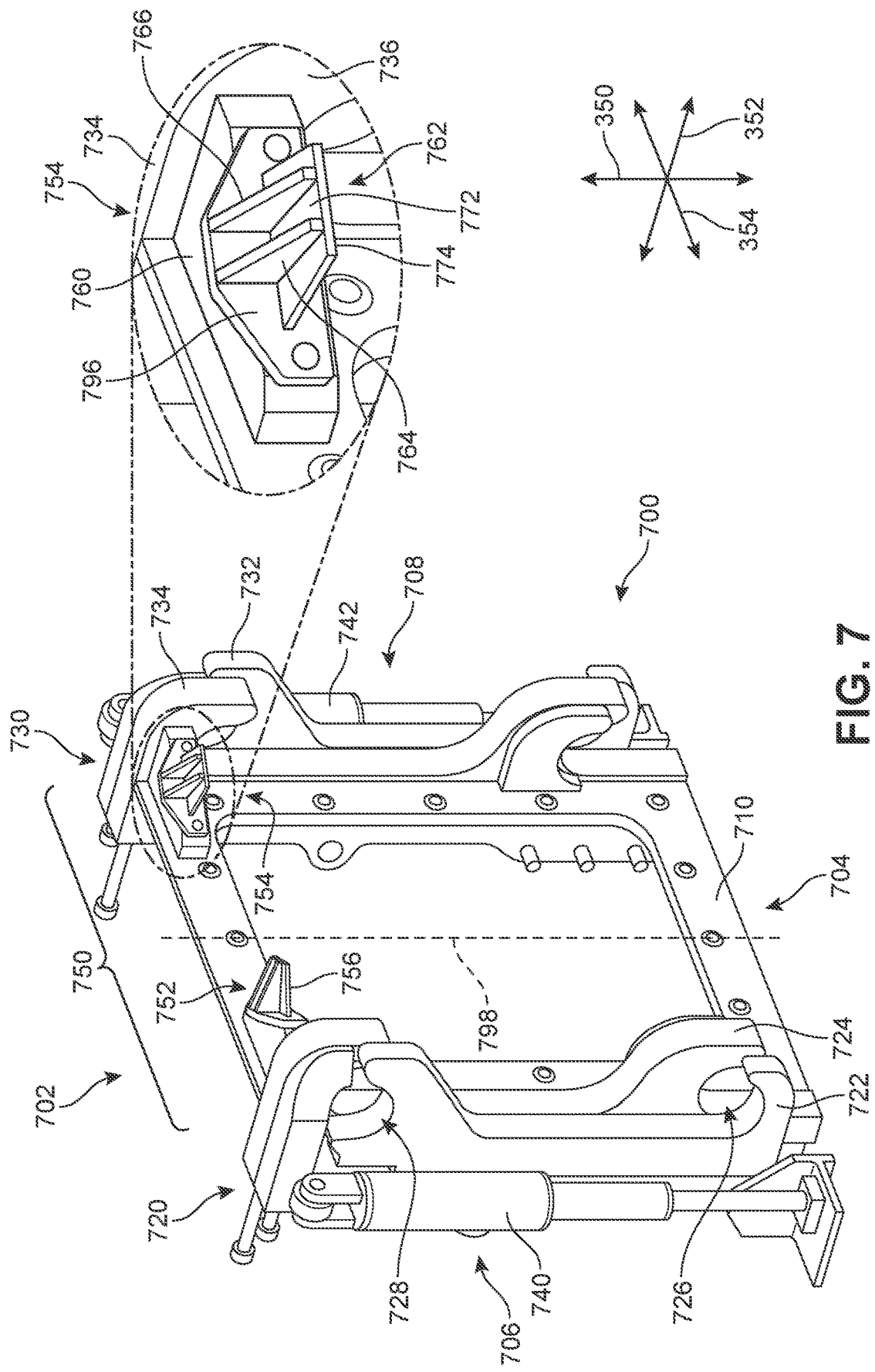
FIG. 7 is a schematic isometric view of an embodiment of a battery lift mechanism of a mining vehicle.

In order to better illustrate the connection process between a vehicle and the battery assembly, FIG. 7 depicts an isometric schematic view of a lift mechanism 700 configured for use with different embodiments of the proposed stabilization system. The lift mechanism 700 is presented in isolation in FIG. 7 for purposes of clarity, but can also be seen installed on the vehicle 100 in FIG. 2, where it is disposed along the rearward-facing surface 210 that directly faces toward central region 220 of the forward portion of the battery assembly 104.

In the embodiment of FIG. 7, the lift mechanism 700 includes a frame body 710 that has a substantially rectangular shape, with an opening in the middle of the frame. For purposes of reference, the lift mechanism 700 can be generally demarcated as having an upper portion 702 and a lower portion 704, both extending in a direction aligned with lateral axis 354, as well as a first side portion 706 and a second side portion 708, both extending in a direction aligned with vertical axis 350. In addition, in some embodiments, the lift mechanism 700 may be substantially symmetrical with respect to a midline 798 aligned with vertical axis 350.

In different embodiments, the lift mechanism 700 can include provisions for contacting and engaging with the battery assembly. As shown in FIG. 7, the first side portion 706 includes a first engagement assembly 720, and the second side portion 708 includes a second engagement assembly 730. The first engagement assembly 720 includes a first outer lift arm 722 and a first inner lift arm 724, and the second engagement assembly 730 includes a second outer lift arm 732 and a second inner lift arm 734.

In some embodiments, each pair of lift arms can be configured to move relative to one another and to the frame body 720. For example, the first engagement assembly 720 further includes a first hydraulic cylinder 740, and the second engagement assembly 730 includes a second hydraulic cylinder 742. Each hydraulic cylinder can be configured to move the lift arms between an open configuration (see FIGS. 8A and 8B) and a closed configuration (see FIG. 8C). The closed configuration is represented in FIG. 7, whereby each pair of lift arms has been brought close together such that two openings are formed of a size and dimension designed to securely surround and hold the mounting bars of the battery assembly. For example, first engagement assembly 720 includes a first opening 728 formed between the two lift arms near to the top portion 702, and a second opening formed between the two lift arms near to the bottom portion 704. It can be understood that two corresponding openings are also formed between the lift arms of second engagement assembly 730.

It can be desirable that the components of the stabilization system of the battery assembly automatically transition to the retracted mode at the appropriate time (e.g., during mounting of the battery assembly onto the vehicle). In different embodiments, engagement between the lift mechanism 700 and a battery assembly may be configured to cause the retraction. For example, interaction between two sets of components found on the frame body 710 and the battery assembly can trigger the retraction of the stabilizing support posts (see FIGS. 8A-8C). The interaction specifically occurs between the top portions of the actuator mechanism (see FIGS. 4 and 5) and a set of depressors 750 disposed along the upper portion 702 of the frame body 710. In FIG. 7, there are two depressors, including a first depressor 752 and a second depressor 754. Each depressor includes a substantially flat bottommost base surface. For example, first depressor 752 includes a first base 756 and second depressor includes a second base 762.

In general, the two depressors can be understood to be substantially symmetrical (mirror-image) structures relative to midline 798. For purposes of clarity, a magnified view of the second depressor 754 is depicted in FIG. 7. As shown in the magnified view, the second depressor 754 is disposed in a corner area formed by the intersection of upper portion 702 of the frame body 710 with an inwardly facing surface 736 of the second inner lift arm 734. In different embodiments, the depressor includes a substrate 760. In some non-limiting examples, the substrate 760 has a substantially triangular three-dimensional shape for fitting snugly into the corner area. In this case, the substrate 760 includes a substantially L-shaped inwardly-facing periphery that is in direct contact with, fixedly attached to, and substantially flush with, the corner area.

Furthermore, an outwardly facing periphery of the substrate (e.g., corresponding to the hypotenuse) provides a surface for the mounting of a wing portion 796 of the depressor. As a non-limiting example, the wing portion 796 can have a substantially six-sided outer shape that is substantially symmetrical. Along an outwardly facing surface of the wing portion 796, the second base 762, a first reinforcement portion 764, and a second reinforcement portion 766 extend distally outward. The first reinforcement portion 764 and second reinforcement portion 766 are substantially aligned with a vertical plane that is diagonal relative to lateral axis 354 and longitudinal axis 352. In some non-limiting embodiments, each reinforcement portion is substantially similar, and includes a triangular prism shape. In FIG. 7, the reinforcement portions each include a vertex of approximately 90 degrees that is disposed at the intersection of an upper surface 772 of the second base 762 and the wing portion 796.

One of the most critical features of the depressors is the downward-facing surface of their bases. Specifically, each base includes a downward-facing substantially flat or smooth surface. For example, second base 762 includes a lower surface 774 that is an opposite facing surface relative to upper surface 772. In this example, the lower surface 772 is substantially aligned with a horizontal plane. In different embodiments, the lower surface 772 of the second base 762 is configured to extend over and/or above the upwardly facing surface of an actuator, and then push down on (depress) the actuator, as will be discussed in FIGS. 8A-8C. This pressure on the base is reinforced by the two reinforcement portions, ensuring the surface remains substantially flat and consistently presses down on the actuator below. In other embodiments, the base and/or lower surface 772 can be slightly angled or sloped such that the most rearward edge of the lower surface 772 is inclined (at a greater height) relative to the most forward edge of the base (at a lower height), facilitating the sliding capture and depression of a top portion of an actuator.

Figure 8A:
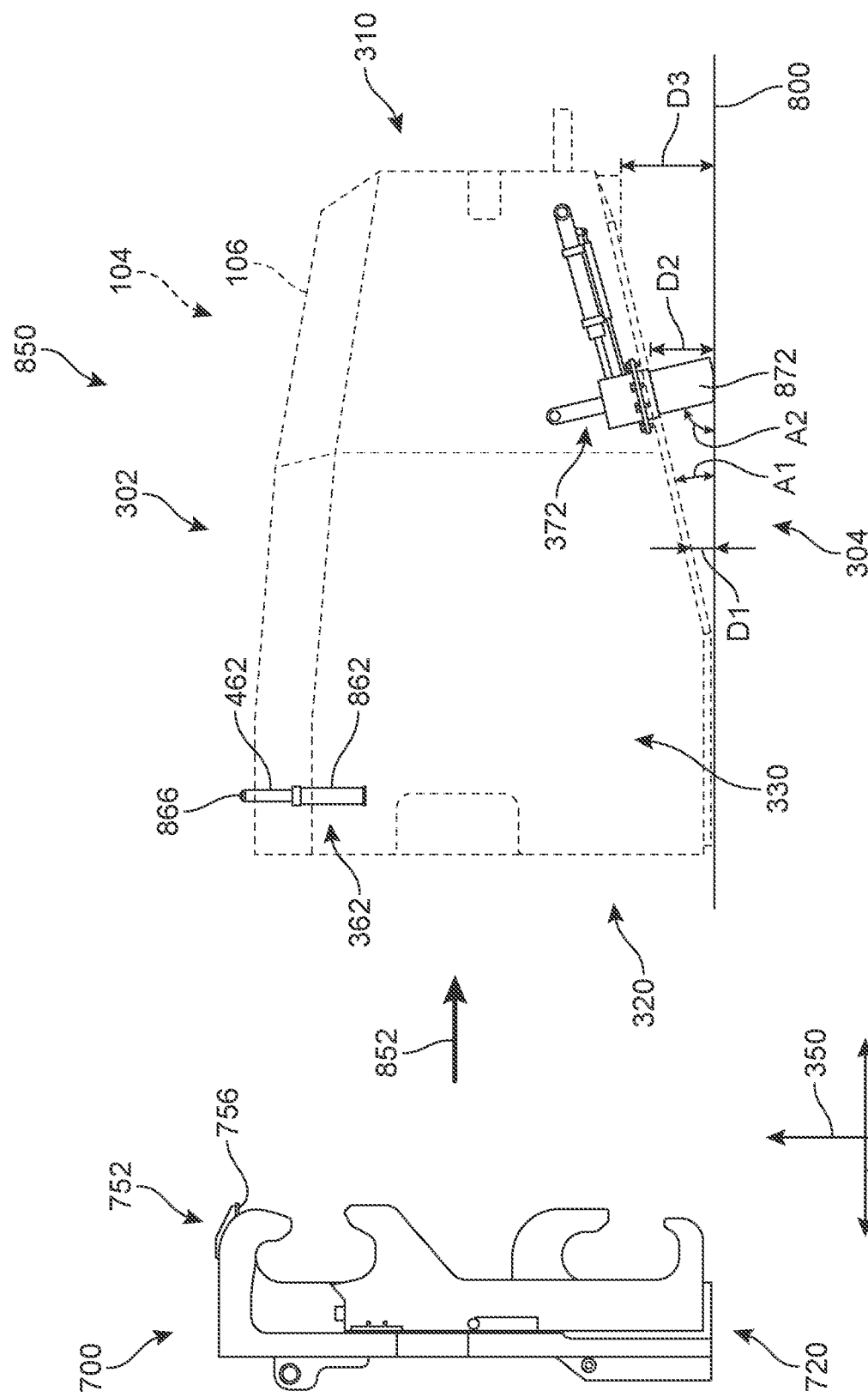
Figure 8B:
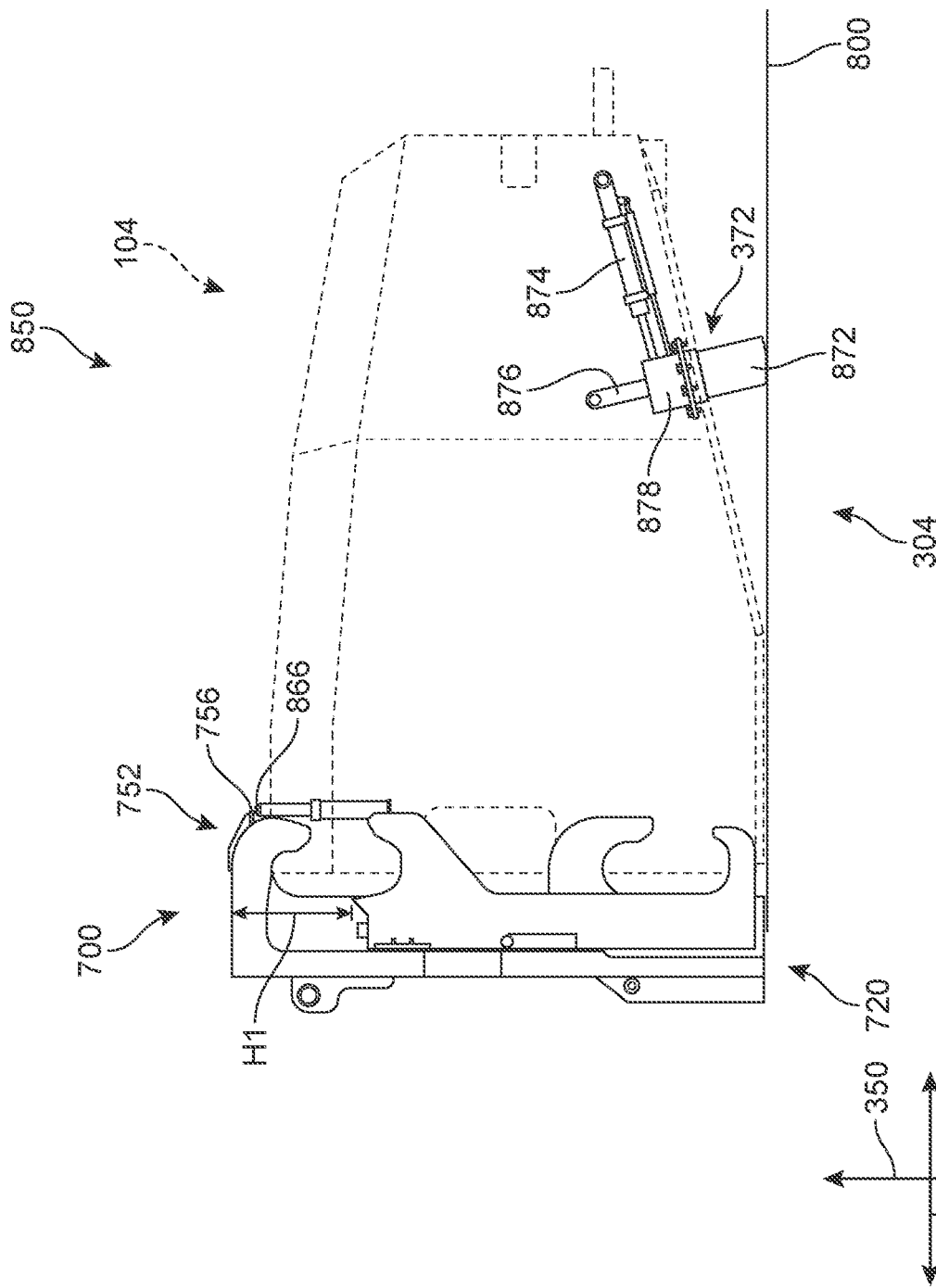

In order to better illustrate the features of the stabilization systems described herein, FIGS. 8A-8C present a sequence in which the stabilization system of the battery assembly transitions from the deployed mode to the retracted mode. In FIGS. 8A-8C, a side-view of the lift mechanism 700 and a transparent side view of battery assembly 104 are shown, comprising components of an embodiment of a stabilization assembly 850. It should be understood that lift mechanism 700 is again presented in isolation for purposes of clarity, and can be seen installed on the vehicle in FIG. 2.

FIG. 8A depicts a pre-docking stage, where the lift mechanism 700 faces toward the central region of the forward portion 320 of battery assembly 104. The lift mechanism 700 is spaced apart from the battery assembly 104, ready to move rearward in a first direction 852 that is substantially aligned with longitudinal axis 352. In the side-view shown in FIG. 8A, the curvature of bottom region 304 of the battery assembly 104 can be more clearly seen, sloping generally upward in the first direction 852. In this case, the housing 106 has an exterior first bottom surface region that directly contacts a ground surface 800, which then transitions to an exterior second bottom surface region that is sloped at an angle A1 relative to ground surface 800. Moving in first direction 852, the distance between the ground surface 800 and the sloped second bottom surface region increases from a first distance D1 to a second distance D2, where a support post 872 of the first stabilizer 372 is shown protruding outward from bottom region 304 of rearward portion 310 at an inner acute angle A2 relative to the ground surface 800. Angle A2 is selected to maximize the stability of the support posts on the ground surface while maintaining the pose (i.e., preventing backward tipping) of the battery assembly. In some embodiments the length of the support post can be substantially perpendicular to the ground (such that angle A2 is approximately 90 degrees). Thus, when the support posts are deployed, the first bottom surface region remains horizontal and substantially in contact with the ground, rather than tipping backward.

The second bottom surface region continues to slope upward relative to the ground surface 800 until it terminates at the most rearward portion of the housing 106, and the distance between the ground surface 800 increases from second distance D2 to a larger third distance D3. In one embodiment, the support post has an exterior (deployed) length (see FIG. 6) configured to allow the battery assembly to remain stable on the ground surface, such that the first bottom surface region remains substantially flat and/or a substantial entirety of the first bottom surface region remains in full contact with the ground, rather than tipping, leaning, slanting, rolling, or tilting backward as a result of the curvature of the second bottom surface region and the weight of the rearward portion.

The first actuator 362 is also shown in the deployed mode, such that the first top portion 462 is exposed and extends vertically upward out of a base receptacle 862 that remains within the housing 106. The first top portion 462 further includes an uppermost contact region ("contact region") 866 at the very top of the top portion 462. The contact region 866 is configured to engage with lower surface 774 (see FIG. 7) of the first depressor 752 of lift mechanism 700, as will be described below. It should be understood that, though not visible here, the first actuator 362 is mechanically connected to the first stabilizer 372, such that depression of the actuator is an actuation event that causes the hydraulic cylinder of the stabilizer to compress. Similarly, in embodiments where the stabilization system includes two sets of actuators and stabilizers, the second actuator and second stabilizer (see FIG. 3) are also mechanically connected. Thus, no electrical components are included or necessary for the stabilizers to deploy or retract.

In FIG. 8B, the lift mechanism 700 has traveled closer toward forward portion 320, and is no longer spaced apart from the battery assembly 104. In other words, the lift mechanism 700 is in a pre-engagement state, where the two components (700, 104) may be directly adjacent and/or in contact with one another, but have not yet been locked together for the lifting operation. In addition, the first engagement assembly 720, still in the open configuration, has a height that is greater than the height of the front of the housing 106, where the difference in height is represented as a first height H1. This difference allows for at least a portion of the first base 756 of first depressor 752 to be disposed directly above the contact region 866 of first actuator 362.

In different embodiments, the stabilization system includes provisions for enabling the support post 872 to travel from the deployed position to the retracted position. Referring to FIGS. 8B and 8C, additional details regarding the operation of the stabilizers will be provided. In FIG. 8B, some elements of first stabilizer 372 are identified for purposes of reference, including the support post 872, a central portion 878, a mechanical linkage assembly 876 comprising a first link and a second link (only one is visible in FIG. 8B), and a hydraulic cylinder ("cylinder") 874 that is connected to the support post 872 at the movable intersection between the two link portions (see FIG. 8C). In the deployed state shown in FIG. 8B, the support post 872 is disposed outside of the housing 106, while the remaining elements are retained within the housing 106. Furthermore, the length of the cylinder extends at a downward angle to point generally directly toward the central portion 878. In one embodiment, the cylinder 874 is arranged to form an approximate right angle with the axis of the central portion 878.

In this example, the stabilizer is actuated by the hydraulic cylinder 874, and the hydraulic cylinder 874 includes a piston rod that is configured to move the linkage assembly 876. The piston rod extends from a cylinder barrel of the hydraulic cylinder 874 and is movably connected (permitting relative rotation) to the linkage assembly 876 at a coupling joint that movably connects the two links. In the deployed state shown in FIG. 8B, the piston rod is pushed outward toward the central portion 878, exerting pressure on the coupling joint. The links are therefore in a substantially straightened arrangement when in the deployed state. For purposes of this disclosure, movably connected refers to a connection between two elements and/or components that is configured to allow each element or component to move and/or change position relative to the other element or component. Some non-limiting examples of movable connections include hinges, slides, brackets, and other connectors that permit movement of two or more parts that are otherwise fixedly attached or joined to one another. The linkage assembly 876 is then passively locked in the extended position, resisting disengagement and/or a return to the retracted configuration until the actuator is depressed, ensuring the support post remains extended. In other words, the support post(s) will not revert back to the retracted position until the hydraulic cylinder retracts the piston rod, which only occurs in response to depression of the actuator.

In different embodiments, when the corresponding actuator for a stabilizer is depressed, the stabilizer is configured to automatically retract. This is depicted in FIG. 8C, where the lift mechanism 700 has transitioned from the open configuration to the closed configuration by moving its outer and inner lift arms closer together and forming openings (726, 728) for engaging or docking with the battery assembly, for example by clasping and retaining the mounting bars, thereby allowing for a secure lift operation. As a result, the first depressor 752 has also moved vertically downward in a second direction 854, until first base 756 presses or exerts a force on the top surface (contact region) of the first actuator, no longer visible here as it has become obstructed from view by the closed configuration of the lift mechanism 700. In some embodiments, the depression causes all or substantially all of the top portion of the first actuator to retract into housing 106. In one embodiment, the top portion is pushed or inserted into the base receptacle 862. In some cases, base receptacle 862 is a substantially cylindrical structure with a channel that is configured to snugly receive and retain the top portion during depression.

As shown in the embodiment of FIG. 8C, in response to the depression of the first actuator, the cylinder 874 can contract, thereby causing the linkage to be pulled backward. In such cases, the linkage can transition from a substantially linear configuration to a retracted, bent, folded, or collapsed configuration. The piston rod and linkage assembly are in a retracted position, where the length of the piston rod is disposed substantially within the cylinder barrel, as shown in FIG. 8C. This configuration will be referred to as a retracted state of the stabilizer. The first link and second link are now arranged in a V-shape at an acute, second angle relative to one another (rather than their linear arrangement shown in FIG. 8B).

This retraction operation in turn pulls the support post 872 upward and inward at an angle in a third direction 856. The support post 872 can pass through the central portion 878 at this time. During this stage, the support post 872 is no longer exposed and has become encased or enclosed in the housing 106. In other words, the bottom surface region no longer includes a protruding kickstand, and is ready to be lifted onto the vehicle.

It can be appreciated that the process shown in FIGS. 8A-8C can be readily reversed when the battery assembly is to be dismounted from the vehicle. As the battery assembly is disengaged or undocked from the lift assembly, the depressor will release its pressure on the actuator, permitting the top portion to 'pop' back up. In response, the stabilizer will automatically extend the piston rod within the cylinder barrel, causing the coupling joint to be pushed out, and straightening the linkage assembly back into the deployed position depicted in FIGS. 8A and 8B. In turn, the support post will be pushed back outward, thereby transitioning the stabilization system from the retracted state to the deployed state.

Figure 9A:
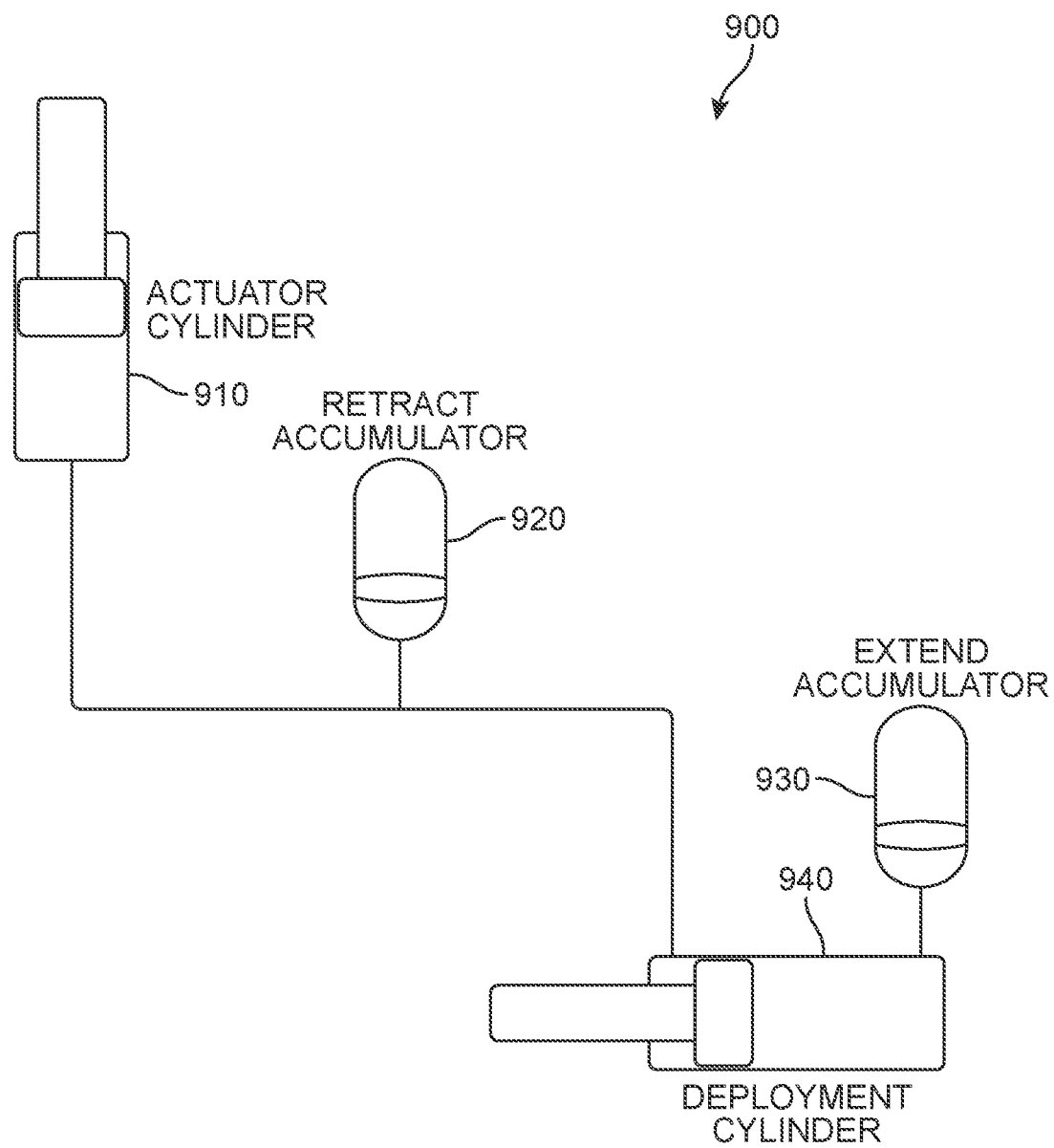
FIGS. 9A and 9B are flow diagrams depicting an embodiment of a process of deployment and retraction of the stabilization system.
Figure 9B:
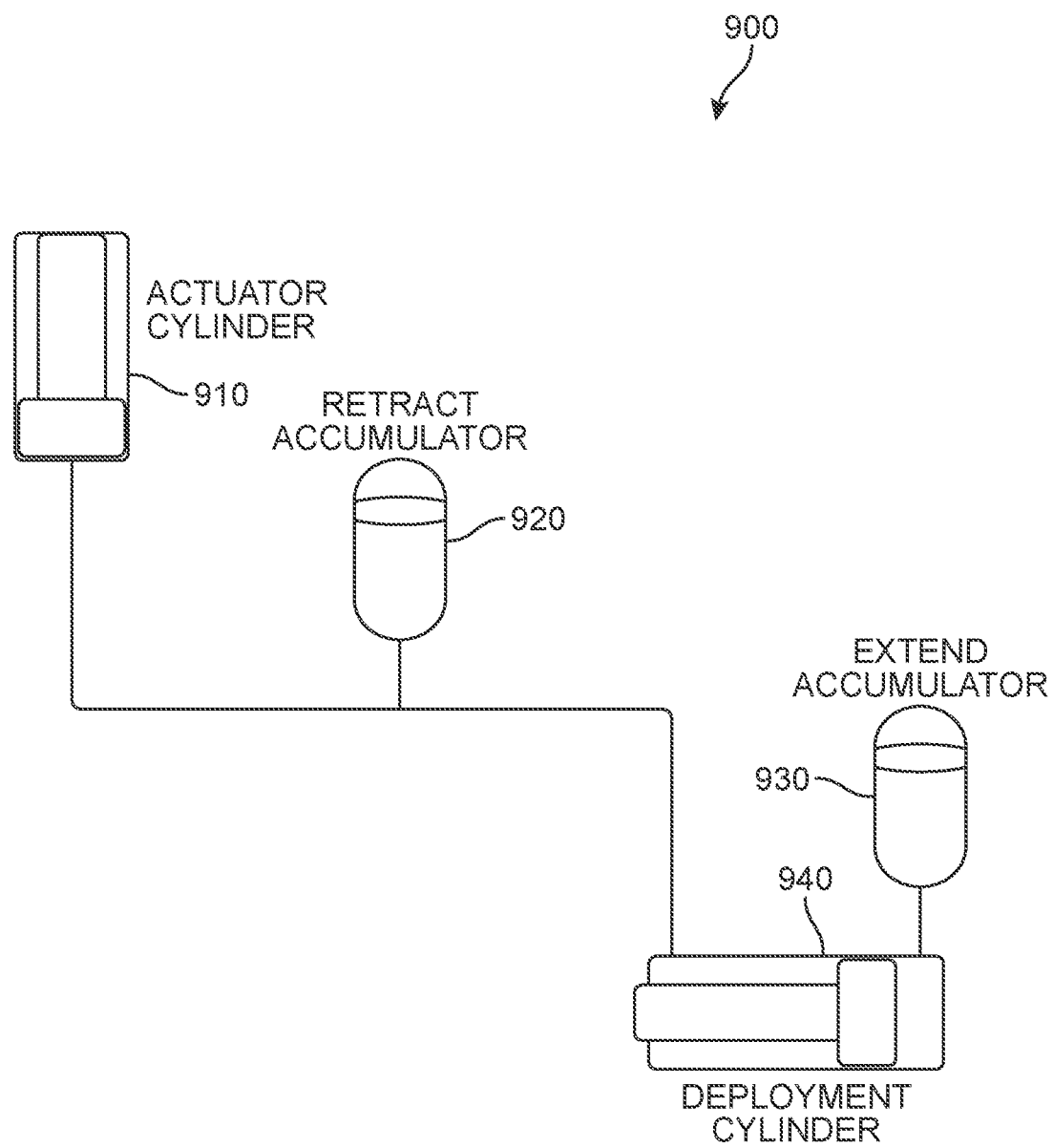

Referring now to FIGS. 9A and 9B, two schematic diagrams illustrate a high-level operation flow of an embodiment of a stabilization system 900. The deployed state is depicted in FIG. 9A, and the retracted state is depicted in FIG. 9B. As noted earlier, the actuator and stabilizer are mechanically connected, such that changes in the state of the actuator result in changes in the state of the stabilizer. In FIG. 9A, a retract accumulator 920 is in its default engaged state, corresponding to the top portion of the actuator protruding out of the housing (see FIGS. 8A and 8B). Therefore, a connected extend accumulator 930 is also engaged, causing a deployment cylinder 940 to push the support post outward in the deployed position. When the actuator cylinder 910 is then depressed by the lift mechanism, the retract accumulator 920 shifts to a disengaged state, as shown in FIG. 9B. This further causes a release of the extend accumulator 930, and the deployment cylinder 940 is pulled inward, thereby transitioning the stabilization system from the deployed state to the retracted state.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A battery assembly for an electric vehicle, the battery assembly comprising:
   a housing including a forward portion, a rearward portion, a first side portion, a second side portion, and a bottom region, wherein the bottom region includes a sloped exterior surface along the rearward portion and a substantially flat exterior surface along the forward portion;
   a first stabilizer disposed in the rearward portion of the housing, the first stabilizer including a first support post mounted in a first aperture formed in the bottom region of the housing; and
   a first actuator disposed in the forward portion of the housing, wherein the first actuator is mechanically connected to the first stabilizer, and
   wherein the first stabilizer is configured to retract the first support post within the housing in response to the first actuator being actuated, and wherein the first stabilizer is configured to extend the first support post outside the housing in response to the first actuator being released.

2. The battery assembly of claim 1, wherein the housing further includes an interior cavity configured to receive one or more battery packs.

3. The battery assembly of claim 1, further comprising:
   a second stabilizer disposed in the rearward portion of the housing, the second stabilizer including a second support post mounted in a second aperture formed in the bottom region of the housing; and
   a second actuator disposed in the forward portion of the housing, wherein the second actuator is mechanically connected to the second stabilizer, wherein the second stabilizer is configured to retract the second support post within the housing in response to the second actuator being actuated, and wherein the second stabilizer is configured to extend the second support post outside the housing in response to the second actuator being released.

4. The battery assembly of claim 1, wherein the first support post, when extending outside the housing, has a length that causes a substantial entirety of the flat exterior surface to remain in contact with a ground surface, thereby providing stability to the battery assembly.

5. The battery assembly of claim 1, wherein the first stabilizer further includes a first hydraulic cylinder that, when extended, causes extension of the first support post outside the housing.

6. The battery assembly of claim 1, wherein the first actuator further includes a first top portion that protrudes outside of the housing when the first actuator is released, and wherein actuation of the first actuator involves a depression of the first top portion until the first top portion is disposed within the housing.

7. The battery assembly of claim 6, wherein the first top portion has a substantially cylindrical three-dimensional shape.

8. The battery assembly of claim 6, wherein the first top portion is received by a first base receptacle of the first actuator when the first top portion is depressed.

9. The battery assembly of claim 1, wherein the first support post is disposed entirely within the housing when retracted within the housing.

10. An electric vehicle, the electric vehicle comprising:
a battery assembly including a housing, a first actuator, and a first stabilizer; and
a lift mechanism, the lift mechanism configured to dock with the battery assembly, and wherein the lift mechanism actuates the first actuator when the battery assembly docks with the lift mechanism, thereby causing a first support post of the first stabilizer to automatically transition from a deployed state in which the first support post extends outside the housing to a retracted state in which the first support post is retracted within the housing.

11. The electric vehicle of claim 10, wherein the lift mechanism further includes a depressor, and the depressor is configured to contact an exposed first top portion of the first actuator when the lift mechanism docks with the battery assembly, and wherein the first support post is disposed entirely within the housing when the first actuator is actuated.

12. The electric vehicle of claim 11, wherein the depressor includes a base with a smooth lower surface that is substantially aligned with a horizontal plane, and the lower surface contacts the exposed top portion during docking, and wherein the depressor is disposed directly adjacent to an engagement assembly of the lift mechanism.

13. The electric vehicle of claim 10, wherein the battery assembly includes a second actuator and a second stabilizer, and wherein the lift mechanism actuates the second actuator when the battery assembly docks with the lift mechanism, thereby causing a second support post of the second stabilizer to automatically transition from a deployed state in which the second support post extends outside the housing to a retracted state in which the second support post is retracted within the housing.

14. The electric vehicle of claim 10, wherein separation of the battery assembly from the lift mechanism automatically releases the first actuator, causing the first support post of the first stabilizer to revert to the deployed state.

15. The electric vehicle of claim 10, wherein the battery assembly includes a sloped bottom surface, and wherein the first support post extends outside the housing from an opening in the sloped bottom surface in the deployed state, thereby preventing the battery assembly from tipping.

* * * * *